June 6, 1944.   F. J. HEYWOOD   2,350,681
SHUT-OFF COUPLING
Filed Aug. 3, 1943
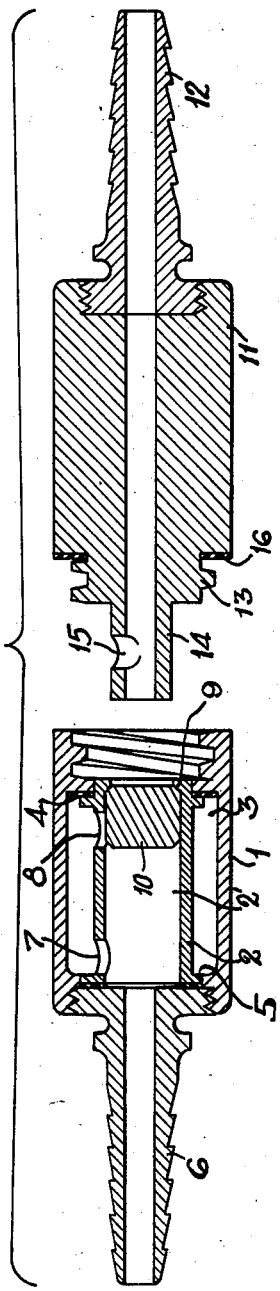
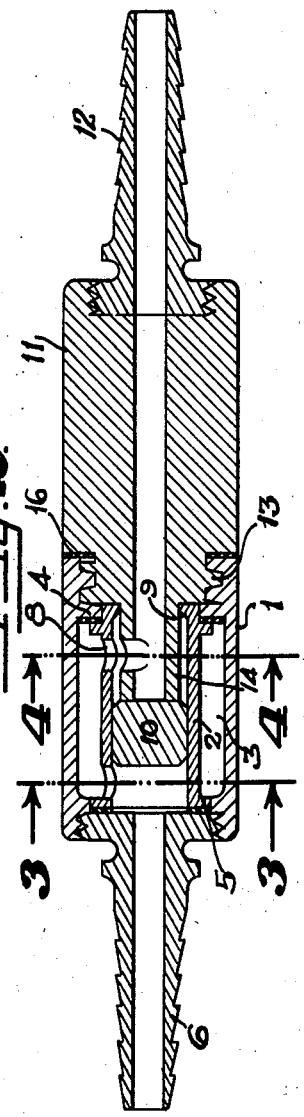
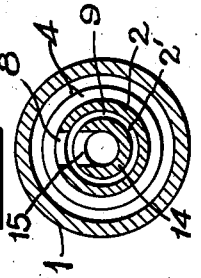
INVENTOR,
Frank J. Heywood
BY
J. E. Trabucco
ATTORNEY.

Patented June 6, 1944

2,350,681

UNITED STATES PATENT OFFICE 2,350,681

SHUTOFF COUPLING

Frank J. Heywood, Mill Valley, Calif.

Application August 3, 1943, Serial No. 497,253

4 Claims. (Cl. 284—19)

This invention relates to improvements in couplings, and more particularly to a hose coupling which is equipped with an automatic shut-off valve.

An object of this invention is to provide an improved hose coupling having an automatic valve, which, when the coupling operation is completed, will allow the free flow of air or other pressure fluid through the coupling, and which, when the coupling is disconnected, will automatically close that part of the coupling supplied with the pressure fluid.

Another object of this invention is to provide an improved coupling for tubular conduits, one part carrying a check valve which is adapted to be automatically actuated to a closed position by fluid pressure directed against it, and another part having a projecting member which, when the coupling is completed, will move the valve to an open position against the fluid pressure.

Other and further objects of this invention will be pointed out hereinafter, or will be indicated in the appended claims, or will be obvious to one skilled in the art upon an understanding of the present disclosure. For the purpose of this application, I have elected to show certain forms and details of a shut-off coupling representative of my invention; it is to be understood, however, that the embodiment of my invention herein shown and described is for the purpose of illustration only, and that therefore it is not to be regarded as exhaustive of the variations of the invention, nor is it to be given an interpretation such as might have the effect of limiting the claims, short of the true and most comprehensive scope of the invention in the art.

In the accompanying drawing illustrating the preferred principles of my invention—

Fig. 1 is a longitudinal sectional view showing the two parts of the coupling in detached positions;

Fig. 2 is a similar view showing the coupling with the parts connected to one another;

Fig. 3 is a sectional view taken on the line 3—3 of Fig. 2;

Fig. 4 is a sectional view taken on the line 4—4 of Fig. 2.

Referring to the drawing, the numeral 1 designates an outer tubular member or casing having an inner tubular member 2 arranged concentrically therein to provide a central bore 2'. The inner tubular member is spaced from the outer tubular member so as to provide an annular channel or chamber 3 which is closed at one end by a sealed annular partition 4 and at its opposite end by an end wall 5. The casing is suitably secured to a serrated tubular extension 6 to which a hose or other suitable conduit is normally connected. In ordinary practice compressed air or other fluid under pressure is directed through the tubular extension 6 and into the inner tubular member 2 from a suitable source. The inner tubular member is provided near the outlet end of the extension 6 with one or more openings which provide fluid outlet means 7 for the passage of the pressure fluid to the annular chamber 3. The pressure fluid is again admitted to the inside of the inner tubular member 2 through one or more openings which provide inlet means 8. The inlet means 8 is located near a valve seat 9 which is provided at the outlet end of the inner tubular member 2. Slidably mounted in the bore 2' of the inner tubular member 2 is a suitably shaped valve element 10 which is adapted to be actuated in a direction toward the valve seat 9 by the fluid supplied to the inlet end of said inner tubular member. The valve element, when moved to an engaging position with respect to the valve seat 9, closes the outlet means 8 and prevents the flow of the fluid through the outlet end of the inner tubular member.

The complementary part of the coupling comprises a body 11 of somewhat the same general shape and size as the outer tubular member 1, having an axial bore for the passage of a fluid. The body 11 is provided at one end with a serrated tubular projection 12 to which an outlet hose or other suitable conduit is normally connected. The opposite end of the body 11 is provided with an externally threaded extension 13 which is adapted to extend into and engage with the internally threaded open end of the outer tubular member 1 when the coupling is completed. The body 1 is also provided at said opposite end with an axial tubular extension 14 having one or more inlet openings 15 which, when in registry with the inlet means 8 of the inner tubular member 2, allows the flow of fluid from the annular chamber 3 to the tubular extension, from whence it proceeds through the axial bore in the body 11 to the serrated tubular extension 12. When the coupling is completed by the screwing of the threaded extension 13 into the threaded end of the outer tubular member 1, the axial tubular extension engages with the valve element 10 and forces it against the pressure of the fluid in the inner tubular member to a position whereby the inlet means 8 is uncovered. When the extension 13 of the body 11 has been fully screwed into the outer tubular member 1, the inlet opening 15 will have come into registry with the inlet means 8, thereby allowing the continuous flow of fluid through the coupling. A washer 16 is preferably provided between the adjacent ends of the body 11 and outer tubular member 1.

When the body 11 and the outer tubular member 1 are detached, the valve element 10 will be actuated by the pressure of the fluid thereon to an engaging position with respect to the valve seat 9, thereby shutting off the flow of fluid through the female part of the coupling.

The coupling comprising the present invention is particularly useful in facilitating the connection of a pneumatic tool with a line leading to a source of compressed air. The joining of the male and female parts of the coupling will automatically connect the tool with the source of compressed air, and the disconnection of the said parts of the coupling will automatically discontinue the flow of compressed air past the valve element. The valve element may embody a spherical or other suitable shape, and if desired a facing of rubber or other material may be provided either on the valve seat or on the contacting part of the valve element.

Having described my invention, what I claim is:

1. A shut-off coupling comprising an outer casing having connecting means at one end, an inner tube positioned inside the casing and arranged to provide a fluid channel between it and the casing, the said inner tube having a fluid inlet at one end and a fluid outlet at its opposite end, the said inner tube having a fluid outlet means and a fluid inlet means in its walls each connecting with the fluid channel, the fluid outlet means being spaced from the fluid inlet means, a valve element slidably mounted in the inner tube and arranged to be actuated by the fluid entering the inner tube to simultaneously close the inlet means and the fluid outlet of the inner tube, a tubular body having a part engageable with the connecting means of the outer casing, a tubular extension on the body arranged when the body is connected to the casing to force the valve element to a position in the inner tube whereby the inlet means and the fluid outlet of the inner tube are both opened, the said tubular extension having an inlet opening arranged to register with the inlet means of the inner tube when the casing and the tubular body are connected, whereby the fluid may freely flow through the coupling.

2. A shut-off coupling comprising an outer casing having a fluid inlet at one end, a fluid outlet at its opposite end and a central bore connecting with the fluid inlet and the fluid outlet, a fluid channel in the casing arranged alongside the central bore, fluid outlet means and fluid inlet means connecting the central bore with the opposite ends of the channel, a valve element slidably mounted in the central bore and arranged to be actuated by the fluid entering the bore to close the inlet means, and a tubular body connectable to the fluid outlet end of the casing having a tubular extension arranged to move the valve element against the fluid pressure in the bore to a position whereby the fluid inlet means is opened, the said tubular extension having an inlet arranged to register with the fluid inlet means when the tubular body and the casing are connected.

3. A shut-off coupling comprising a casing having a central bore, one end of which is provided with a fluid inlet and its opposite end with a fluid outlet, a channel arranged in the casing in spaced but substantially parallel relationship to the central bore, fluid outlet means and fluid inlet means connecting the bore with opposite ends of the channel, a valve seat at the outlet end of the bore, a valve element reciprocably mounted in the bore and arranged to be actuated into engagement with the valve seat by the pressure of fluid entering through the fluid inlet of the bore, whereby the fluid inlet means and the fluid outlet are both closed, and a tubular body connectable to the casing, having an open extension arranged to enter the bore and unseat the valve element and thereby open the inlet means and the outlet, whereby the fluid may freely flow through the casing and through the tubular body.

4. A shut-off coupling comprising an outer casing having an axial bore, one end of which is provided with a fluid inlet and its opposite end with a fluid outlet, a channel arranged in the casing alongside the axial bore, fluid outlet means connecting the inlet end of the bore with the channel, fluid inlet means connecting the bore adjacent its outlet end with the channel, a valve seat at the outlet end of the bore, a valve element reciprocably mounted in the bore and arranged to be actuated into engagement with the valve seat by the pressure of fluid entering through the fluid inlet of the bore, whereby fluid is prevented from proceeding through the outlet of the bore, and a tubular body connectable to the casing having means for unseating the valve to open the outlet of the bore.

FRANK J. HEYWOOD.